UNITED STATES PATENT OFFICE.

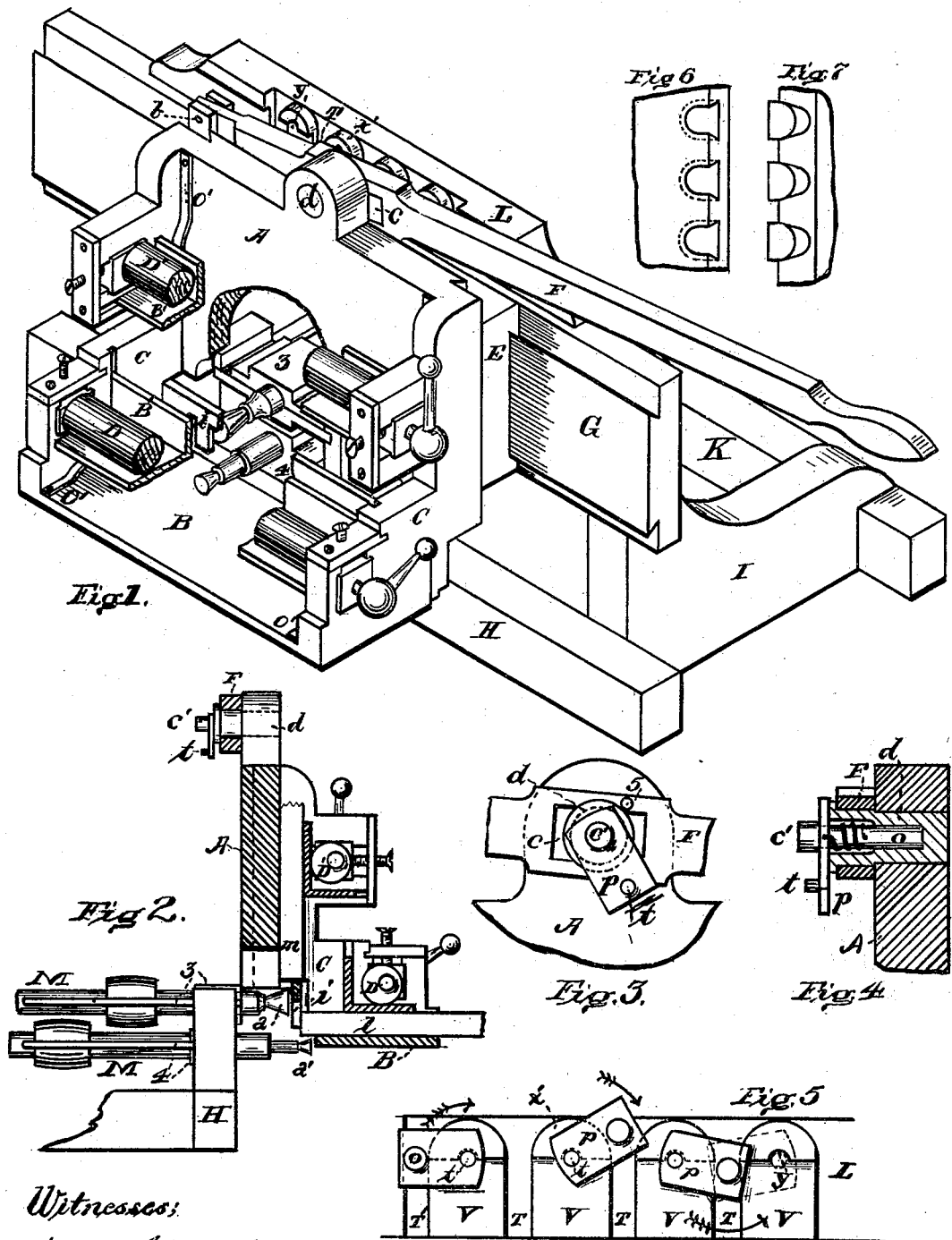

CHARLES STENGEL, OF HAMILTON, OHIO.

IMPROVEMENT IN DOVETAILING-MACHINES.

Specification forming part of Letters Patent No. 199,117, dated January 8, 1878; application filed January 20, 1877.

*To all whom it may concern:*

Be it known that I, CHARLES STENGEL, of Hamilton, in the county of Butler and State of Ohio, have invented a new and useful Improvement in Machines for Forming Dovetail Joints in Wood-Working; and I do hereby declare that the following is a full and exact description thereof, reference being had to the accompanying drawings, and to the letters of reference marked thereon.

Figure 1 is a perspective view of my improved machine, with portions of the carriage and clamping devices broken away to exhibit the location of the cutting-tools and their adjustable carriages. Fig. 2 is a transverse vertical section of the lumber-carriage, with the lumber to be worked; also represents the relation of the cutting-tools and their mandrels to the carriage, and to the lumber secured therein. Fig. 3 represents the rear side of a portion of the carriage, and its connection with the slotted hand-lever and the self-acting dog, which governs the movement of the carriage. Fig. 4 represents a vertical section of a portion of the carriage and of the hand-lever, and exhibits the self-acting dog with its spiral spring and arbor. Fig. 5 represents the vertically-grooved gaging-plate, and exhibits the varying positions of the self-acting dog in relation thereto during the operation of the machine. Figs. 6 and 7 represent the ends of two detached pieces of lumber, upon which the dovetail joint has been formed.

My present invention consists in certain improvements in the dovetailing-machine for which the patent numbered 183,030 was granted to me October 10, 1876.

In both of these improved machines the hand-lever F, carriage A B C, traveling-plate E, and vertical plate G are constructed and connected substantially alike; and the description of these parts, their connection, and operation, contained in my patent above referred to, are equally applicable to this improved machine.

Instead of sleeves upon the clamping-rolls I now employ angle-plates B', which work in the carriage-frame, and furnish greater clamping-surface for holding the lumber. The eccentric-rolls D D' work in contact with the plates B', which are kept in contact with their respective rolls by springs O'.

Lever F, hinged to the stud $b$, has a slot, C, through which the pin $d$ attached to the carriage projects, as represented in Fig. 3, by means of which the carriage is moved vertically upon plate E, and horizontally with plate E upon plate G.

The arbor O, seated in the center of pin $d$, carries the dog P, which is connected with its arbor by the spiral spring, as represented in Fig. 4. The projecting end $c'$ of arbor O is of larger diameter than the orifice in the dog-plate P, and serves to hold the dog in proper relation to the lever F and pin $d$, and also serves as a guide, as hereinafter explained.

Upon the upper edge of plate G the vertically-grooved plate L is fastened, and the projecting end $c'$ of arbor O corresponds in diameter with the width of grooves T in plate L, to govern the descent of the carriage and the lumber secured therein, and to gage the work of the cutting-tools $a$ $a'$.

The ribs V, between grooves T of plate L, are made with semicircular caps $x'$, with curved recesses $y$ in their projecting under sides or edges, as represented in Figs. 1 and 5, and the tooth $t$ of dog P catches in the recesses $y$ during the operation of the machine, as will be presently explained.

The lumber $l$ $m$ is secured in the carriage, as shown in Fig. 2, and held in proper position for the action of the tools $a$ $a'$ by means of the comb $i$, which serves as a stop to prevent the lumber from being pushed too far into the carriage, and by the clamping mechanism D D' and plates B' the end of the piece of lumber $m$ rests against the upper edge of comb $i$ in proper position for the tool $a$ to cut that part of the joint shown in Fig. 6, while the end of the piece $l$ is in contact with the teeth of the comb and held by clamp D, and its plate B' in proper relation to the tool $a'$ for cutting the tenons, as shown in Fig. 7. The two mandrels M, which respectively carry tools $a$ $a'$, are seated in boxes upon independently-adjustable frames or carriages 3 and 4, and the pulleys upon these mandrels are so arranged that they can be driven by two belts connecting with a driving-shaft.

One of the objects of my present improvement is to form dovetail joints of various kinds by the use of two cutting-tools of different sizes, operating at the same time and at each descent of the carriage, each cutting-tool forming that part only of the joint required upon one piece of lumber.

Another object of this improved machine is to make a perfectly-fitting joint by cutting the tenons with rounded sides corresponding with the curved surfaces of the seats of the mortises, as shown in Figs. 6 and 7.

To effect these purposes, I use augers or tools of certain relative sizes—as, for instance, the tool which forms the tenons and mortises on one piece may be one-quarter of an inch in diameter, when that used for making the recesses or mortises and tenons on the other piece will have a diameter of three-quarters of an inch, and these proportions may be varied.

As before stated, this machine is operated substantially as that described in my patent of October 10, 1876. The difference in this respect relates to the mechanism for rounding the sides of the tenons and to the independently-working cutting-tools. The attendant, in using this machine, will commence the work by raising the carriage with lever F, and adjusting it so that tooth $t$ and projecting guide $c'$ will, as the lever descends with the carriage, pass down the first groove T' of plate L, and as the lever descends the position of the stop-pin 5 (above the slot in lever F, which catches against the corner of the dog-plate P and retains it while ascending) in relation to the arbor O and fulcrum-pin $d$ is changed, and the dog-plate is released, so as to permit the spiral spring to act upon it and give to it a partial revolution, throwing the detent $t$ into the circular recess $y$ under the cap $x'$, and then, after the carriage has been forced down so that the lever F stops against the plate E, and the tools $a\ a'$ have performed their work upon the lumber, the attendant will again raise up the lever F with the carriage and draw them forward, thereby causing the guide $c'$ to pass over the upper surface of the curved head or cap $x'$, and when the lever is again forced down with the carriage the spiral spring again acts upon dog-plate P and causes it to perform another partial revolution, which will again cause detent to catch in the next recess $y$, and thus the operation is repeated until the pieces of lumber are properly jointed.

When, at the end of each operation, and new pieces of lumber are clamped in the carriage, the attendant will raise the lever so as to carry up the dog-plate P in nearly a vertical plane, which will allow the stop-pin 5 to come in contact with the corner of the plate P, and prevent the action of the spiral spring until the beginning of the first descent of the lever and carriage, as before described, the tooth $t$, holding in recess $y$, causes the guide $c'$ to act in contact with circular cap $x$ as the carriage moves forward, and while this guide $c'$ is passing over the curved surfaces of the cap $x'$ the cutting-tool $a'$ will form the curved side of the tenon, as seen in Fig. 7.

To prevent tool $a'$ from breaking off or splitting the edges of the tenons at the termination of each cut, a block of wood may be secured upon the piece of lumber, so as to counteract this effect and avoid this liability.

Automatic machines for making dovetail joints have been constructed to form the tenons with curved sides, corresponding with the rounded seats of the mortises cut by augers; but such machines employed combinations of mechanism which I do not use in my improved machine; besides, those machines could not form the alternate dovetails of different sizes, which is done at the same operation with my hand-power machine.

I am also aware that dovetailing-machines have been constructed so as to clamp the pieces to be dovetailed together in positions at right angles to each other.

What I claim as my invention, and desire to secure by Letters Patent, is—

1. The combination of the clamping-plates B', with their respective eccentric-rolls D D', upon the lumber-carriage A B C, as and for the purpose described.

2. The combination of two independently-working cutting-tools with the lumber-carriage and its operating mechanism, organized substantially as and for the purpose described.

3. The curved and recessed heads $x'$ of ribs V upon plate L, in combination with the reciprocating spring-dog P, as and for the purpose described.

4. The reciprocating self-acting dog P, provided with tooth $t$, in combination with guide $c'$, lever F, and stop 5, as and for the purpose described.

Witness my hand this 13th day of January, 1877.

CHARLES STENGEL.

Witnesses:
 SAMUEL MALLERT,
 LIBOR STENGEL.